United States Patent [19]

Kusaka et al.

[11] Patent Number: 4,500,778

[45] Date of Patent: Feb. 19, 1985

[54] IMAGE PLANE DEVIATION AMOUNT DETECTING DEVICE

[75] Inventors: Yosuke Kusaka, Kawasaki; Toru Fukuhara, Isehara, both of Japan

[73] Assignee: Nippon Kogaku K.K., Tokyo, Japan

[21] Appl. No.: 617,133

[22] Filed: Jun. 4, 1984

Related U.S. Application Data

[63] Continuation of Ser. No. 366,113, Apr. 6, 1982, abandoned.

[30] Foreign Application Priority Data

Apr. 7, 1981 [JP] Japan .................................. 56-51121

[51] Int. Cl.³ ................................................ G03B 3/10
[52] U.S. Cl. ..................................... 250/204; 250/201
[58] Field of Search ................ 354/402, 407; 250/204, 250/201 PF; 356/1, 4, 141, 152

[56] References Cited

U.S. PATENT DOCUMENTS

| | | | |
|---|---|---|---|
| 4,185,191 | 1/1980 | Stauffer | 250/204 |
| 4,373,791 | 2/1983 | Araki | 250/201 |
| 4,410,804 | 10/1983 | Stauffer | 356/4 |
| 4,417,139 | 11/1983 | Kusaka | 250/204 |
| 4,458,145 | 7/1984 | Voles | 250/204 |

Primary Examiner—David C. Nelms
Assistant Examiner—J. Brophy
Attorney, Agent, or Firm—Shapiro and Shapiro

[57] ABSTRACT

An image plane deviation amount detecting device includes means for converting the amount of lateral deviation between two object images formed by two light beams passing through two areas of the exit pupil of a focus detecting lens into an amount of image plane deviation including the sign and absolute amount thereof, whereby when utilized in an automatic focus apparatus, it is not only capable of effecting quick automatic focusing operation even when there is a response delay in the focus detecting device, but also capable of displaying the focus adjusted condition in the form of a quantitative amount of image plane deviation when utilized in a display device.

5 Claims, 7 Drawing Figures

IMAGE PLANE DEVIATION AMOUNT DETECTING DEVICE

This is a continuation of application Ser. No. 366,113 filed Apr. 6, 1982, now abandoned.

BACKGROUND OF THE INVENTION

1. Field of the Invention

This invention relates to a device for detecting the position of an image of an object, and more particularly to an image plane deviation amount detecting device of an automatic focusing apparatus in a camera.

2. Description of the Prior Art

A focus detecting device disclosed in U.S. Pat. No. 4,185,191 or U.S. Pat. No. 4,264,810 for making a first image and a second image by an imaging lens from light beams passed through two areas of the exit pupil of a picture-taking lens and detecting front focus, rear focus or in-focus from the amount of displacement of the first and second images relative to a pair of image position detecting photoelectric converters disposed in or near the focal plane of the imaging lens (hereinafter referred to as the amount of lateral deviation between the object images) is known in the prior art.

In a so-called automatic focusing apparatus for automatically rendering the picture-taking optical system into in-focus condition by the information of focus condition obtained from the focus detecting device of this type, the control of movement of the picture-taking lens as hereinafter described has heretofore been effected. By the information of front focus or rear focus from the focus detecting device, movement of the picture-taking lens toward the in-focus point is started. The focus detecting device detects the focus condition also during the movement of the picture-taking lens and stops the picture-taking lens when it detects the in-focus condition or the vicinity thereof.

What has been described above can be regarded as the so-called feedback loop control using an optical system. However, where there is a response delay in the focus detecting device due to the charge accumulating time or the signal processing time when a light-receiving element such as CCD is used, if the picture-taking lens is moved at the usual speed of lens movement, there is the possibility that a situation arises in which the focus detecting operation cannot overtake the movement of the picture-taking lens. In such a case, there arises the so-called hunting in which the picture-taking lens goes past the in-focus point and is again moved back in the reverse direction and therefore, the lens movement must be done at a low speed and this may lead to the problem that the automatic focusing operation cannot be accomplished quickly.

SUMMARY OF THE INVENTION

It is an object of the present invention to overcome the above-noted disadvantages and to provide an image plane deviation amount detecting device which enables quick automatic focusing and which has been improved in accuracy.

The detecting device according to the present invention includes means for converting the amount of lateral deviation 2d between two object images formed by two light beams passing through two areas of the exit pupil of a focus detecting lens into an amount of image plane deviation $\Delta x$ including the sign and absolute amount thereof, whereby when utilized in an automatic focus apparatus, it is not only capable of effecting quick automatic focusing operation even when there is a response delay in the focus detecting device, but also capable of displaying the focus adjusted condition in the form of a quantitative amount of image plane deviation when utilized in a display device.

The invention will become more fully apparent from the following detailed description thereof taken in conjunction with the accompanying drawings.

DESCRIPTION OF THE PREFERRED EMBODIMENTS

Figure 1A:
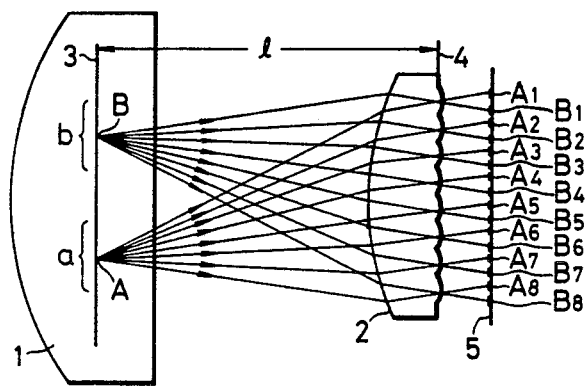
FIG. 1A shows an embodiment of a focus detecting device to which the present invention is applicable.

FIG. 1A shows an example of the focus detecting device to which the present invention is applicable. Reference numeral 1 designates a picture-taking lens optical system, reference numeral 2 denotes a focus detecting lenslet array having a number of lenslets arranged on the back side thereof, reference numeral 3 designates a particular plane near the exit pupil of the picture-taking lens optical system 1, and reference numeral 4 denotes a surface conjugate with a film surface and this surface will hereinafter be referred to as the focus detecting surface. The detecting surface 4 is substantially coincident with the surface on which the lenslets are arranged. A light-receiving element array 5 disposed behind the lenslet array 2 is constituted by a group A comprising photoelectric elements $A_1, A_2, \ldots, A_8$ on which is incident the light beam from a small area a centered at a point A on the particular plane 3, and a group B comprising photoelectric elements $B_1, B_2, \ldots, B_8$ on which is incident the light beam from a small area b centered at another point B on the particular plane 3. The distance between the particular plane 3 and the focus detecting surface 4 is l. The particular plane 3 is a plane whose position is determined by a focus detecting system comprising the lenslet array 2 and the light-receiving element array 5, and as described above, it lies near the exit pupil plane of the picture-taking lens optical system. Specifically, in the example shown, it is coincident with the plane of the images of the photoelectric elements $A_1$–$A_8$ and $B_1$–$B_8$ constituting the light-receiving element array 5 by the lenslet array 2. Generally, the focus detecting device cannot be installed on the film surface and therefore, focus detection is effected on a surface equivalent to the film surface.

Figure 1B:
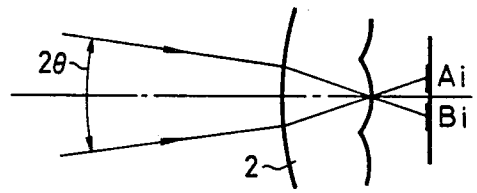
FIG. 1B is an enlarged view of a portion of FIG. 1A.

As shown in FIG. 1B which is a partial enlarged view of FIG. 1A, the angle at which a set of pairs $A_i$ and $B_i$ ($i = 1, 2, 3, \ldots, 8$) installed near the lens optical axes of the light-receiving element array groups A and B subtend the two points A and B on the particular plane is $2\theta$.

The principle of the focus detecting method will hereinafter be described by reference to FIGS. 2A, 2B and 2C.

Figure 2A:
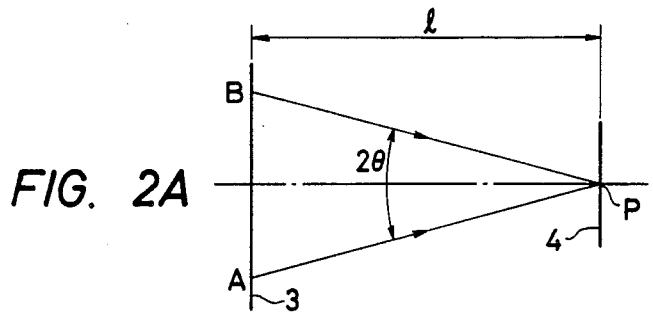
FIG. 2A illustrates the focus detection during in-focus.

FIG. 2A shows a case where the picture-taking optical system is in in-focus condition, and the light beams having passed through the two points A and B on the particular plane intersect each other at a point P on the focus detecting surface 4. Accordingly, the light beams from the points A and B respectively makes deviationless images on the focus detecting surface 4. Thus, there is created no deviation between the outputs of the light-receiving element array groups A and B.

Figure 2B:
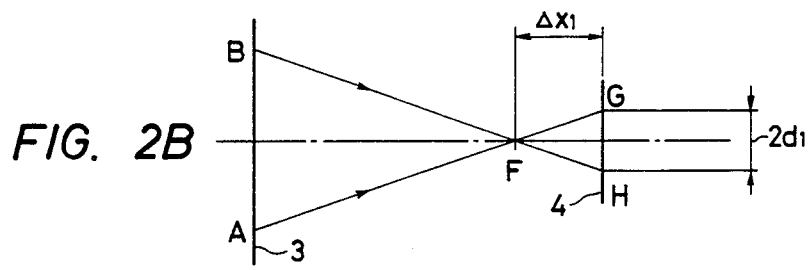
FIG. 2B illustrates the focus detection during front focus.

FIG. 2B shows a case where the picture-taking optical system is in front focus condition, and the light beams from the two points A and B intersect each other at a point F lying $\Delta x_1$ ahead of the focus detecting surface 4 and are incident on points G and H, respectively, on the focus detecting surface 4. Accordingly, these light beams creates on the focus detecting surface images deviated $2d_1$ from each other, and this amount of lateral deviation $2d_1$ between the object images can be known from the amount of deviation between the outputs of the light-receiving element array groups A and B.

Figure 2C:
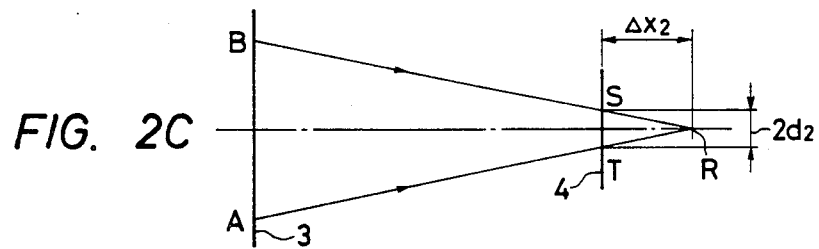
FIG. 2C illustrates the focus detection during rear focus.

FIG. 2C shows a case where the picture-taking optical system is in rear focus condition, and the light beams from the points A and B are incident on points T and S, respectively, on the focus detecting surface 4 and intersect each other at a point R lying $\Delta x_2$ behind the surface 4. At this time, on the focus detecting surface 4, images deviated $2d_2$ from each other in the opposite direction from that in the front focus condition are created, and the amount of lateral deviation $2d_2$ between the object images can be known from the amount of deviation between the light-receiving element array groups A and B.

Accordingly, generally, if the amount of lateral deviation between the object images on the focus detecting surface is 2d, the sign thereof differs between front focus condition and rear focus condition and for example, if the sign is predetermined as $d<0$ in the case of front focus condition, as $d=0$ in the case of in-focus condition and as $d>0$ in the case of rear focus condition, then the focus condition of the picture-taking optical system can be known by detecting the amount of lateral deviation 2d and examining the sign thereof. This is fully described in the aforementioned U.S. Pat. No. 4,185,191. By repeating the operation of moving the picture-taking lens toward the in-focus position on the basis of the sign of the amount of lateral deviation between the object images (namely, the front-focus and rear-focus discrimination sign), again detecting the amount of lateral deviation between the object images after a certain degree of movement of the picture-taking lens and moving the picture-taking lens on the basis of that detection, that is, by applying an optical feedback, the picture-taking lens can be gradually brought close to the in-focus position. However, this cannot quicken the focusing operation.

So, in the present invention, automatic focusing is accomplished by calculating the distance $\Delta x$ between the focus detecting surface (the film surface) and the object imaging plane F, R (hereinafter referred to as the amount of image plane movement) from the amount of lateral deviation 2d between the object images, and moving the picture-taking lens by an amount which negates this amount of image plane movement $\Delta x$. That is, automatic focusing is accomplished by simultaneously detecting the direction of movement of the picture-taking lens and the amount of movement thereof.

The calculation of the amount of image plane movement $\Delta x$ from the amount of lateral deviation 2d between the object images may be accomplished by the use of the following equation and by utilizing the fact that in FIGS. 2A, 2B and 2C, $\triangle ABF$ is similar to $\triangle GHF$ and $\triangle ABR$ is similar to $\triangle TSR$:

$$\Delta x = \frac{lxd}{lxtan\theta - d} \quad (1)$$

In equation (1), it is prescribed that in case of front focus condition, $\Delta x<0$ and $d<0$ and in case of rear focus condition, $\Delta x>0$, $d>0$ and $l>0$.

The distance l and $$tan\theta \left( = \frac{\overline{AB}}{2l} \right)$$

are fixed values determined by the focus detecting system comprising the light-receiving element array 5 and the lenslet array 2 and therefore, by detecting the amount of lateral deviation 2d between the object images, the then amount of image plane movement $\Delta x$ can be calculated from equation (1). Equation (1) can be rewritten as follows:

$$\Delta x = \frac{d}{tan\theta} \left( \frac{l}{l - \frac{d}{tan\theta}} \right) \quad (2)$$

Figure 4:
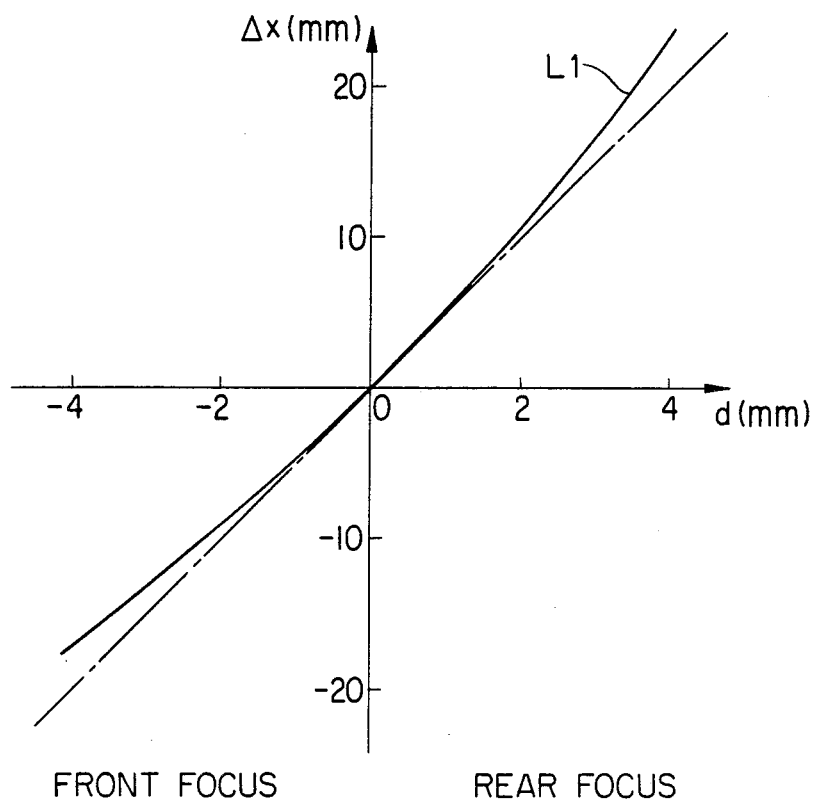
FIG. 4 is a graphical representation showing the amount of lateral deviation between the object images relative to the amount of image plane movement.

When equation (2) is plotted as a graph, it can be shown in the form of a curved line L1 in FIG. 4. In this figure, when the amount of relative displacement or the amount of lateral deviation 2d between the first and the second object images is negative, a front focus state shown in FIG. 2B is obtained, while when the amount of lateral deviation 2d is positive, a rear focus state in FIG. 2C is obtained. As clearly seen from FIG. 4, the ratio of the increase in the amount of image plane movement $\Delta x$ with respect to the increase in the detected amount of lateral deviation 2d is different for the front focus state and the rear focus state. Specifically, at the front focus state as compared with the rear focus state, the rate of change of the amount of image plane movement $\Delta x$ relative to the amount of lateral deviation 2d tends to be smaller. As a result, when the amount of lateral deviation 2d is detected, the picture-taking lens is ideally moved by an amount $\Delta x$ corresponding to the detected amount of lateral deviation 2d with respect to the curved line L1 to be reached at the focus position.

If, on the other hand, depth of focus is taken into consideration, the picture-taking lens can be moved by an amount $\Delta x$ corresponding to the amount of lateral deviation 2d with respect to a graph of a linear line or a polygonal line approximating the curved line L1, and such movement is sufficient in practice.

Figure 3:
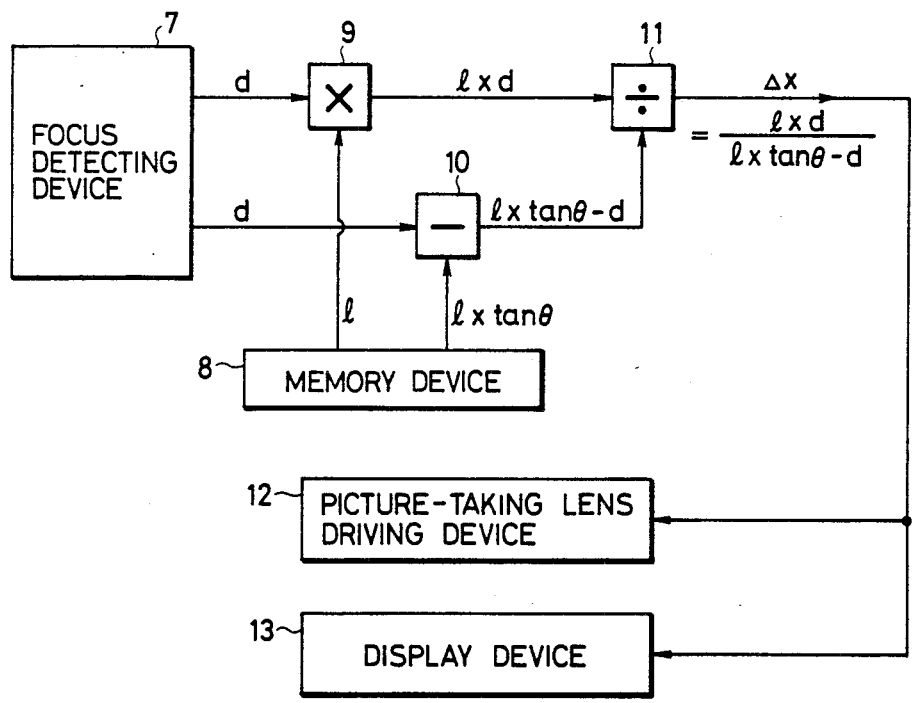
FIG. 3 is a block diagram of an embodiment of the device according to the present invention.

FIG. 3 is a block diagram of an embodiment of the present invention. In FIG. 3, reference numeral 7 designates a focus detecting device. reference numeral 8 denotes a memory device, reference numeral 9 designates a multiplier, reference numeral 10 denotes a subtracter, and reference numeral 11 designates a divider.

First, the amount of lateral deviation d between the object images is detected by the focus detecting device 7 and is generated to the multiplier 9 and the subtracter 10.

The memory device 8 has stored therein the predetermined distance l and the value of the product $l \times \tan \theta$ of the fixed value l when the angle at which the two points A and B on the particular plane are subtended is $2\theta$ and $\tan \theta$, and produces l to the multiplier 9 and $(l \times \tan \theta)$ to the subtracter 10.

The multiplier 9 receives the input values l and d, calculates $(l \times d)$ and generates it to the divider 11.

The subtracter 10 receives the input values $(l \times \tan \theta)$ and d, calculates $(l \times \tan \theta - d)$ and produces it to the divider 11. The divider 11 receives the input values $(l \times d)$ and $(l \times \tan \theta - d)$, calculates the amount of image plane deviation $\Delta x = (l \times d)/(l \times \tan \theta - d)$ and produces it. An output signal representative of this amount of image plane deviation $\Delta x$ is sent to a picture-taking lens driving device 12 and the picture-taking lens is moved by an amount corresponding to the amount of image plane deviation $\Delta x$, whereby automatic focusing can be accomplished. It is also possible to send this $\Delta x$ to a display device 13 and display the amount of image plane deviation $\Delta x$ including the direction thereof.

In the former case, even if there is a response delay in the focus detecting device, the picture-taking lens can be moved to the vicinity of the in-focus point with good accuracy by one focus detection and this leads to the advantage that the time required for focusing can be shortened. In the latter case, there is the advantage that the user can know the focus adjusted condition of the picture-taking optical system directly in the form of the amount of image plane deviation $\Delta x$.

In FIG. 3, the multiplier, the divider and the subtracter are utilized to effect the calculation of the amount of image plane deviation $\Delta x$, but it is of course possible to utilize a microprocessor or the like to effect the calculation of the amount of image plane deviation $\Delta x$ by program processing.

The focus detecting device is not restricted to that shown in FIG. 1A, but it may be a device which is capable of detecting the amount of lateral deviation between two object images formed by the light beams passing through two areas of the exit pupil of the picture-taking lens.

Also, the present invention is of course applicable even to a so-called extraneous light type focus detecting device provided with a lens exclusively used for detection in addition to the picture-taking lens if such device utilizes the light beams from two areas of the exit pupil of the lens for detection.

We claim:

1. In a device having means for making a first image and a second image by an imaging lens from light beams passing through first and second areas of the exit pupil of said imaging lens, and driving said imaging lens to be coincident with an image of an object formed by said imaging lens and a predetermined focal plane on the basis of the amount of relative displacement of said first and second images, the improvement comprising:

means for obtaining the distance between said predetermined focal plane and an imaging plane of the image of said object formed by said imaging lens from the following relation:

$$\Delta x = \frac{d \cdot l}{l \cdot \tan \theta - d}$$

where l is the distance between a plane adjacent to said exit pupil and perpendicular to the optical axis of said imaging lens and said predetermined focal plane, 2d is the amount of relative displacement of said first and second images, $2\theta$ is the angle formed by two light rays passing from substantially the centers of the first and second areas of said exit pupil to the point of intersection between said predetermined focal plane and said optical axis, and $\Delta x$ is the distance between said predetermined focal plane and said imaging plane.

2. The improvement recited in claim 1, further comprising means for moving said imaging lens in the direction of the optical axis in response to said obtaining means.

3. The improvement recited in claim 1, further comprising means for displaying information relative to the position of said imaging plane in response to said obtaining means.

4. In a device having means for making a first image and a second image by an imaging lens from light beams passing through first and second areas of the exit pupil of said imaging lens, and driving said imaging lens to be coincident with an image of an object formed by said imaging lens and a predetermined focal plane on the basis of the amount of relative displacement of said first and second images, the improvement comprising: means for driving said imaging lens in such a manner that the image of said object may move toward said predetermined focal plane by an amount substantially corresponding to $\Delta x$ represented by the following relation:

$$\Delta x = \frac{d \cdot l}{l \cdot \tan \theta - d}$$

where l is the distance between a particular plane adjacent to said exit pupil and perpendicular to the optical axis of said imaging lens and said predetermined focal plane, 2d is the amount of relative displacement of said first and second images, $2\theta$ is the angle formed by two light rays passing from substantially the centers of the first and the second areas of said exit pupil to the point of intersection between said predetermined focal plane and said optical axis and $\Delta x$ is the distance between said predetermined focal plane and said imaging plane of the image of said object formed by said imaging lens.

5. A device by which a first image and a second image are made by an imaging lens from light beams passing through first and second areas of the exit pupil of said imaging lens and an image of an object formed by said imaging lens is coincident with a predetermined focal plane on the basis of the positional relation of said first image and said second image, comprising:

(a) means which detects the amount of relative displacement of said first and second images;

(b) means which forms an output representing the amount of displacement of the image of said object required for making the image of the object coincident with said predetermined focal plane in response to said detecting means, the output forming means including means producing said output on the basis of the relative displacement of said first and second images and so that when the image of said object is at the same side of said predetermined focal plane as said imaging lens the rate of change of the amount of the displacement of the image of said object to the amount of relative displacement of said first and second images is smaller than when the image of the object is at the opposite side of said predetermined focal plane; and (c) means which causes said imaging lens to be moved according to said output.

* * * * *